US012583768B2

(12) United States Patent
Morgenbrod et al.

(10) Patent No.: US 12,583,768 B2
(45) Date of Patent: Mar. 24, 2026

(54) DEVICE AND METHOD FOR STERILISING A FLUID FLOWING THERETHROUGH

(71) Applicant: OSRAM GmbH, Munich (DE)

(72) Inventors: Nico Morgenbrod, Bernau (DE);
Tobias Gleitsmann, Michendorf (DE);
Thorsten Klebba, Berlin (DE);
Mathias Bruemmer, Wusterwitz (DE)

(73) Assignee: OSRAM GmbH, Munich (DE)

( * ) Notice: Subject to any disclaimer, the term of this patent is extended or adjusted under 35 U.S.C. 154(b) by 357 days.

(21) Appl. No.: 18/270,433

(22) PCT Filed: Dec. 13, 2021

(86) PCT No.: PCT/EP2021/085437
§ 371 (c)(1),
(2) Date: Jun. 29, 2023

(87) PCT Pub. No.: WO2022/148605
PCT Pub. Date: Jul. 14, 2022

(65) Prior Publication Data
US 2023/0399242 A1    Dec. 14, 2023

(30) Foreign Application Priority Data
Jan. 5, 2021    (DE) ..................... 10 2021 200 033.9

(51) Int. Cl.
*C02F 1/32*        (2023.01)
*C02F 1/50*        (2023.01)

(52) U.S. Cl.
CPC ............... *C02F 1/325* (2013.01); *C02F 1/50* (2013.01); *C02F 2201/3222* (2013.01);
(Continued)

(58) Field of Classification Search
CPC .............. C02F 1/325; C02F 2201/3222; C02F 2201/328; C02F 2303/04
See application file for complete search history.

(56) References Cited

U.S. PATENT DOCUMENTS 5,069,855 A     12/1991   Takasu et al.
5,626,768 A      5/1997   Ressler et al.
(Continued)

FOREIGN PATENT DOCUMENTS

DE      102014015642 A1    4/2016
DE      102017117324 A1    1/2019
JP        2000288559 A    10/2000

OTHER PUBLICATIONS

International Search Report issued in corresponding International Application No. PCT/EP2021/085437 dated Mar. 15, 2022.

*Primary Examiner* — Bradley R Spies
(74) *Attorney, Agent, or Firm* — ArentFox Schiff LLP

(57)    ABSTRACT

The invention relates to a device for sterilising a fluid flowing therethrough, said device comprising: a container having an inlet for receiving the fluid and having an outlet for discharging the fluid from the container; a body having a surface which is at least in part curved, the body being positioned within the container in such a way that the fluid flowing into the container via the inlet washes over or around at least part of said body at least in the region of its surface that is curved. The device also comprises a plurality of LEDs which are each designed to emit light having wavelengths in the range of UV radiation, preferably UV-C radiation. The LEDs are designed to irradiate the fluid washing over or around the curved surface of the body with the UV radiation of the LEDs.

16 Claims, 4 Drawing Sheets

(52) U.S. Cl.
CPC ........................... *C02F 2201/3227* (2013.01);
*C02F 2201/328* (2013.01); *C02F 2303/04*
(2013.01)

(56)                References Cited

U.S. PATENT DOCUMENTS

| | | | | |
|---|---|---|---|---|
| 6,303,086 | B1 * | 10/2001 | Heimer | ................... C02F 1/325 |
| | | | | 422/186.3 |
| 2015/0030693 | A1 | 1/2015 | Hori et al. | |
| 2015/0314024 | A1 | 11/2015 | Khan et al. | |
| 2019/0225509 | A1 | 7/2019 | Dhiman et al. | |
| 2020/0140291 | A1 * | 5/2020 | Babaie | ...................... A61L 9/20 |
| 2020/0330629 | A1 * | 10/2020 | Massey | ..................... A61L 2/24 |

* cited by examiner

DEVICE AND METHOD FOR STERILISING A FLUID FLOWING THERETHROUGH

CROSS REFERENCE TO RELATED APPLICATIONS

This application is a 35 U.S.C. § 371 National Phase of PCT Application No. PCT/EP2021/085437, filed on Dec. 13, 2021, which claims priority to German Patent Application No. 10 2021 200 033.9, filed Jan. 5, 2021, the disclosures of each of which are hereby incorporated by reference herein in their entireties.

The present invention relates to a device and to a corresponding method for sterilizing a fluid flowing through, in particular a liquid flowing through. The device comprises a container having an inlet for receiving the fluid and having an outlet, at which the fluid can be discharged from the container after flowing through. The device furthermore comprises a multiplicity of LEDs, each of which is designed to irradiate the fluid flowing in an interior of the container with light having wavelengths in the range of UV radiation, preferably UV-C radiation. Such devices are also referred to as UV reactors.

UV reactors may be used in a variety of ways, for instance to treat drinking water or for the sterilization or disinfection of service water or process water which is used, for example, in commercial, agricultural or domestic applications (for example dishwashers). Fluids other than water, for example blood or milk, may also be sterilized by such UV reactors.

Radiation in the wavelength range from 200 nm to 280 nm, which according to DIN 5031-7 is also referred to as far-UV or FUV radiation, proves particularly effective in this case. In addition, there is the neighboring range of from 100 nm to 200 nm, which is correspondingly referred to as vacuum-UV or VUV radiation.

The wavelength ranges indicated above, of up to 280 nm, are denoted in the present application as UV-C radiation, that from 280 nm to 350 nm as UV-B radiation, and that from 315 nm to 380 nm as UV-A radiation, and they are predominantly used in UV reactors. For the purpose of this application, the range of from 10 nm to 121 nm (extreme ultraviolet) is included by the term UV-C radiation used here.

The efficiency of UV reactors for the sterilization of liquids is influenced by the penetration depth of the radiation into the liquid volume. Particularly in the case of UV-C radiation and turbid media, the incident light intensity already drops to a few percent by absorption and/or scattering after a few millimeters, so that relevant disinfection effect cannot be achieved for irradiated layer thicknesses of a few cm or more, or a very high initial optical power would have to be used in order to achieve a sufficient effect after the attenuation. The turbidity of a medium may, for example, be caused by scattering or absorbing particles. These may be organic or inorganic in origin. Examples might be dirt particles, microorganisms, algae or suspended particles, limescale particles or the like. Alternatively or in addition, turbidity may also be caused by emulsions or mixing with other liquids (for example with colloidal constituents).

Firstly, an increase of the radiation power or a reduction of the layer thickness of the liquid may be envisioned as conceivable solutions.

By a suitable increase of the radiation power beyond a critical threshold, for example by more than a factor of 104, a radiation power sufficient to reduce the proliferation of propagable germs may in principle be achieved in all regions of the fluid that are to be disinfected. This solution, however, leads to a great reduction of the energy efficiency of the system because of UV overdosing in a large part of the irradiated region. In LED-based applications, this solution approach would not be viable because of the very low maximum amounts of UV radiation and the high costs of current UV LEDs, in particular UV-C LEDs.

The alternative mentioned above, namely to reduce the thickness of the liquid layer through which irradiation takes place, has the disadvantage that a layer thickness which ensures sufficiently high irradiation above the aforementioned critical threshold may be very low (a few mm) in the case of turbid liquids. In order then to avoid correspondingly reducing the amount of water disinfected per unit time significantly, the flow rate must be increased correspondingly, but this can in turn lead to a shortened UV action time and therefore a lower reduced efficiency.

Various relatively complex solution approaches are furthermore known, in which an attempt is made to resolve the problem described above by the liquid to be disinfected being exposed to the UV radiation as a quasi two-dimensional layer.

U.S. Pat. No. 5,626,768 A discloses an embodiment in which the liquid is moved in a serpentine path between a plurality of planar lamps stacked above one another in levels, UV radiation respectively being emitted by both planar surfaces of each lamp.

JP 2000288559 A discloses a device in which wastewater flows out of an overflow tank in order to flow over the surface of a liquid layer flow channel as a liquid layer with a layer thickness of 10 mm or less. Arranged above the liquid layer flow channel, there are ultraviolet lamps that irradiate the wastewater flowing past in the form of a liquid layer with ultraviolet radiation.

U.S. Pat. No. 5,069,885 A discloses a cylindrical housing having a coaxially arranged cylindrical UV lamp, around which a spiraling path is provided for a fluid such as water flowing through.

Disadvantages of these methods are, however, the bulky, sometimes open constructions and the low throughputs.

It is therefore an object of the invention to develop a device of the type in question for sterilizing a fluid flowing through, in such a way that the aforementioned disadvantages are overcome, and in particular to make the overall size more compact without reductions of the sterilizing effect.

The object is achieved by a device for sterilizing a fluid flowing through, which has the features of patent claim 1. The dependent claims relate to advantageous developments of the device according to the invention.

The starting point is a device for sterilizing a fluid flowing through, which comprises a container having an inlet for receiving the fluid and having an outlet, at which the fluid can be discharged from the container after flowing through. Essentially, it is therefore a flow reactor. The invention nevertheless includes a fluid held in the container, which is previously introduced and subsequently released Furthermore, a body having an at least partially curved surface is provided inside the container. The body is in this case arranged so that the fluid flowing into the container via the inlet washes over or around the body at least in the region of its curved surface. A large surface area provided with a thin liquid film is thereby produced with a compact overall size.

The term "washing over" is to be understood in this context as meaning that the inlet is arranged above the body or alternatively is fed from below upward through the body and ends in the upper region of the surface, the fluid initially being pumped upward inside the body against the force of gravity, or at least the fluid then flows substantially from above downward along the curved surface while following the force of gravity.

The term "washing around", on the other hand, refers to the situation in which the inlet is arranged not above but, for example, below the body or laterally next to the body, and the fluid flows with the aid of an applied fluid pressure (for example by means of a corresponding pump) along the curved surface of the body against the flow of gravity. In both cases, the device may be designed for the pressure of the fluid in the inlet to be adjustable.

The inlet for the fluid may be arranged outside the body or alternatively extend inside the body and end at the curved surface of the body in the form of a corresponding opening.

The inlet may in the simplest case be formed, for example as a tube end, so that the fluid flows out of it as an unshaped jet. Optionally, the inlet may also comprise a nozzle having one or more nozzle openings in order to assist a more uniform distribution of the fluid, in particular on convexly curved rotationally symmetrical surfaces, for example a sphere, cone, ellipsoid, etc.

The curvature of the surface of the body assists the washing over or around the body with the fluid coming from the inlet, as well as the formation of a thin fluid layer. Preferably, the surface of the body is convexly curved at least in the region in which the fluid coming from the inlet impinges or emerges, or on which the fluid flows, in order to distribute the fluid as uniformly as possible in the form of a thin layer on the surface. Furthermore, the surface preferably has a rotational symmetry at least in sections, since a large surface area may in this way be produced with a compact overall size. The curved surface may, for example, be formed in the shape of a sphere, an ellipsoid, a cone, a cylinder or the like, as well as segments thereof.

The curved surface may be smooth or have structuring, for example grooves, corrugations, a golfball structure, roughening, or the like. With structuring, a further increase of the surface area may be achieved.

Furthermore, deliberate adjustment of the fluid layer thickness (=thickness of the fluid film) may be provided while taking into account the physical fluid properties, such as viscosity and flow velocity, in combination with the surface properties of the body such as profile, roughness and geometry.

Furthermore, it is possible to provide a fluid guide device by which a gap dimension between the surface of the body and the correspondingly shaped fluid guide device is established and the layer thickness of the fluid flowing between the surface of the body and the fluid guide device is therefore also established. Furthermore, the fluid guide device is used to guide, or shape, the flow of the fluid on the surface of the body with the aid of the gap formed between the surface of the body and the neighboring surface of the fluid guide device. In one further-developed configuration, the gap dimension may be adapted in combination with the rate of flow to the respective turbidity, so that an optimum of disinfection and throughput is obtained. In addition, automatic adaptation to an optimum may be provided, for example with the aid of a transmission measurement of the fluid. Lastly, readjustment may also be provided in the event of a changing turbidity of the fluid flowing through.

The body may be arranged statically or movably, in particular—for example in the case of a body formed in the shape of a sphere or drum—rotatably. By rotation of the body, for example, self-cleaning may be carried out. The cleaning action may be improved with the aid of a pressing sealing lip.

The thin liquid film is irradiated with UV light during the operation of the device. For this purpose, the device is equipped with a multiplicity of LEDs, each of which is configured to emit light having wavelengths in the range of UV radiation, preferably UV-C radiation, onto the curved surface in order to irradiate the liquid washing over or around this curved surface.

The LEDs for irradiating the fluid layer on the curved surface may be arranged outside the body and/or inside, for example below the curved surface. If the LEDs are arranged inside the body, the curved surface is formed from a material that is transmissive for the UV radiation of the LEDs, for example quartz glass. If the LEDs are arranged outside the body, it may be advantageous for the curved surface to be provided with a layer that is reflective for the UV radiation, for example a metal layer.

Besides the flow guiding and shaping for the fluid, the body may be designed for further functions. For example, the body may be designed for radiation guiding and radiation homogenization. For this purpose, the body—as already mentioned above—may be formed from a material that is transmissive for the UV radiation of the LEDs, for example quartz glass, or may be provided with a surface or layer that is reflective for the UV radiation. Furthermore, the body may be designed for dissipating the heat of the LEDs, for example by using a thermally conductive material, for example aluminum.

Of course, a plurality of devices according to the invention may be arranged in parallel or series in order to be able to irradiate larger amounts of fluid simultaneously by corresponding distribution, or to improve the degree of sterilization in stages.

PREFERRED EMBODIMENTS OF THE
INVENTION

Features that are the same or of the same type may also be denoted below with the same references for the sake of simplicity.

Figure 1:
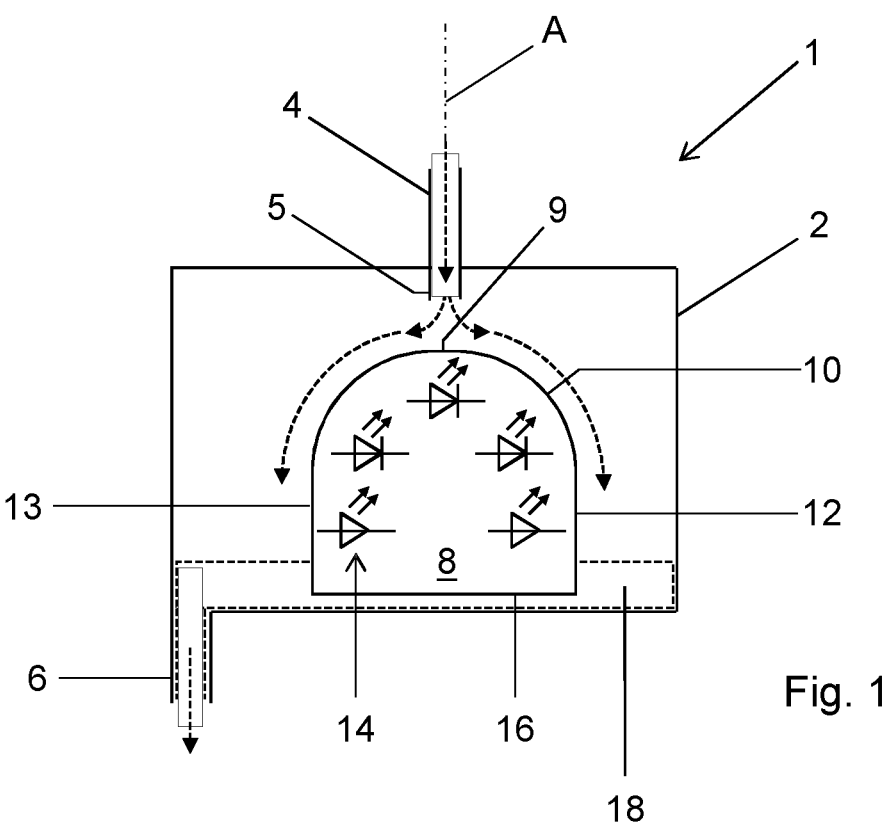
FIG. 1 shows a schematic representation in sectional view of a UV flow reactor according to a first exemplary embodiment of the present invention.

A first exemplary embodiment of a device 1 according to the invention for sterilizing a fluid is shown in a schematic representation in section in FIG. 1. It is a UV-C flow reactor having an inlet 4 and a separate outlet 6. The fluid flowing in and the fluid flowing out are symbolized by corresponding arrows and dashed lines.

The tubular inlet 4 also defines an axis A. Arranged below the inlet 4, there is a body 8 that is rotationally symmetrical with respect to the axis A. The surface 13 of the body 8 has a first section 10, having a convex curvature facing toward the inlet 4. The convexly curved section 10 of the surface 13 may for example be spherical or—as shown in FIG. 1—approximately spherical, or alternatively ellipsoidal or the like. The first section 10 transitions into a circular-cylindrical second section 12. Inside the body 8, a multiplicity of UV-C LEDs 14 (only schematically indicated by symbols) are arranged uniformly distributed as close as possible below the surface 13 of the body 8. The body 8 is made of quartz glass so that the UV-C radiation emitted by the internally arranged LEDs can be transmitted optimally onto the surface 13 of the body 8.

Driver electronics and optionally further control electronics for the operation of the LEDs 14 may also be provided inside the body 8, although this is not represented for the sake of better clarity. Likewise not represented is an internal electrical energy supply of the LEDs 14 or, alternatively, the connection to an external electrical energy supply.

During operation, the fluid flows from the end 5 of the inlet 4 onto the highest point of the body 8, the central impingement point 9 and center of the curved section 10 of the surface 13 of the body. From there, the fluid is distributed on all sides and flows on the surface 13 as a thin fluid film, first over the curved first section 10 and finally downward over the circular-cylindrical lateral face of the second section 12. This is symbolized schematically by dashed lines with arrows. The thin fluid film is irradiated with UV-C radiation through the transparent surface 13 by the LEDs 14 arranged in the interior of the body 8. At the foot 16 of the body 8, the irradiated fluid 18 is collected and flows out of the container 2 via the outlet 6.

Figure 2:
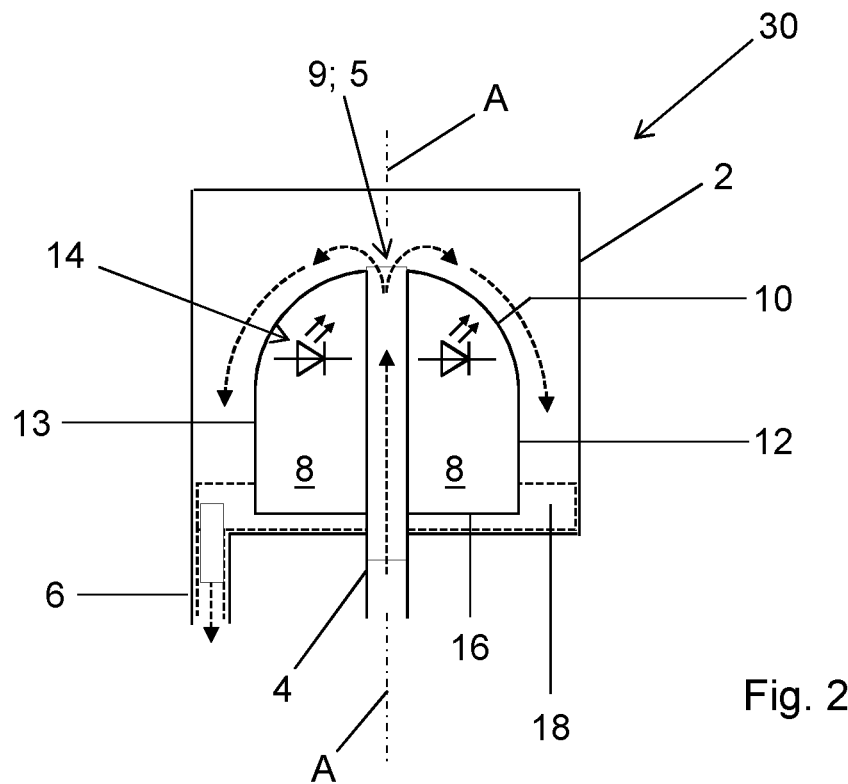
FIG. 2 shows a schematic representation in sectional view of a UV flow reactor having an inlet in the body according to a second exemplary embodiment of the present invention.

FIG. 2 shows a second exemplary embodiment of a device 30 according to the invention in a schematic sectional view. In contrast to the first exemplary embodiment represented in FIG. 1, the inlet 4 is not arranged above the body 8 but is fed from below through the body 8 along the rotation axis A and debouches with its end 5 directly at the center 9 of the first section 10 of the curved surface 13 of the body 8. In this way, the fluid can be conveyed to the end 5 of the inlet, for example with the aid of a pump, and flows (symbolized by dashed lines with arrows) from the center 9 on all sides as a thin fluid film along the surface 13, that is to say first over the convexly curved first section 10 and finally downward over the circular-cylindrical lateral face of the second section 12, as already described in the first exemplary embodiment according to FIG. 1.

Figures 3, 4:
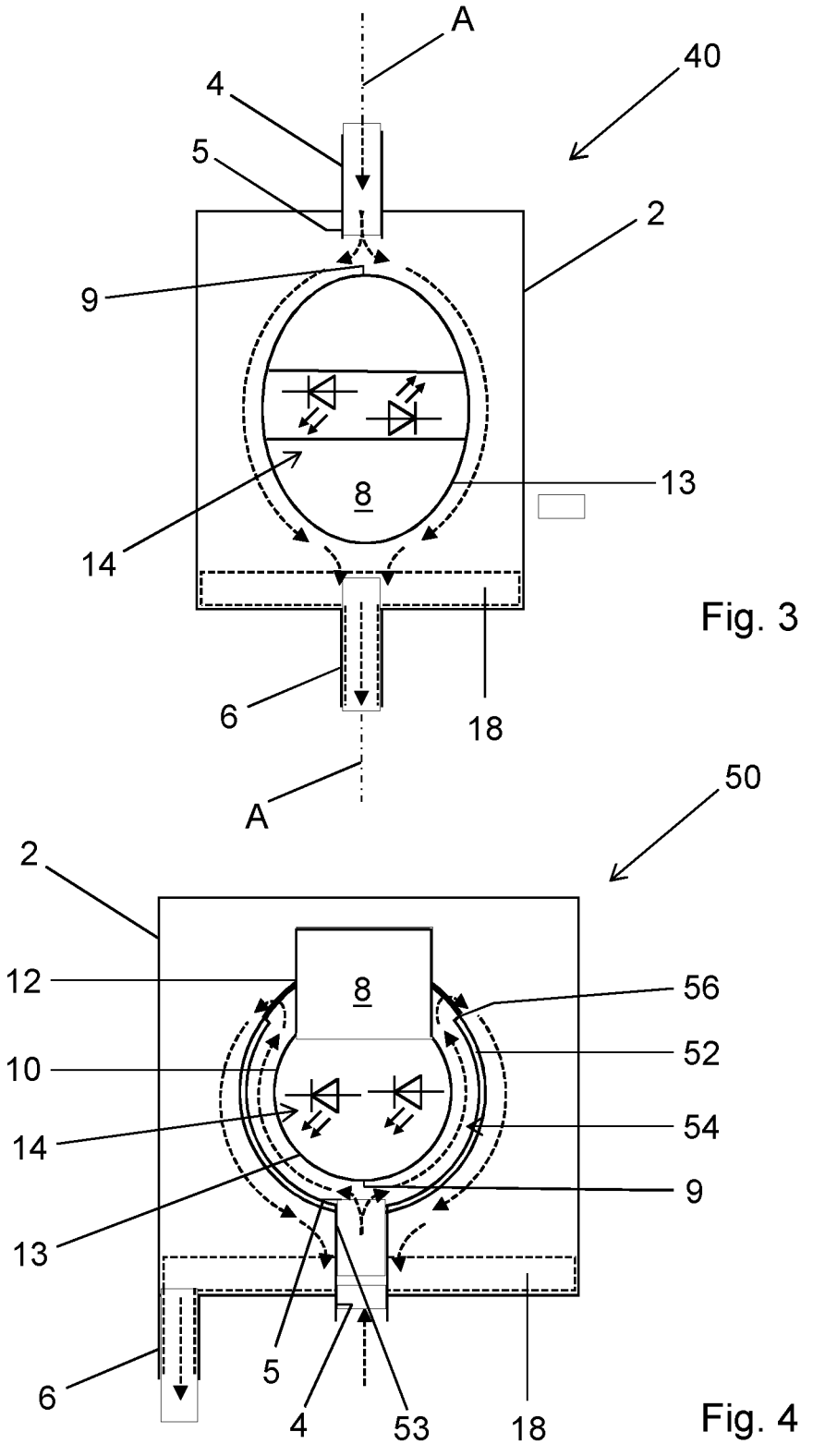
FIG. 3 shows a schematic representation in sectional view of a UV flow reactor having an ellipsoidal body according to a third exemplary embodiment of the present invention.
FIG. 4 shows a schematic representation in sectional view of a UV flow reactor having an inflow arranged below the body according to a fourth exemplary embodiment of the present invention.

FIG. 3 shows a third exemplary embodiment of a device 40 according to the invention in a schematic sectional view. This is a particularly symmetrical configuration, in which the body 8 is shaped as an ellipsoid. In this way, with a particularly compact design, a particularly large part of the overall surface 13 of the body 8 can be used for the fluid film washing over. The fluid film washing over extends on the curved surface 13 from the central impingement point 9 facing the end 5 of the inlet almost as far as the other end of the ellipsoidal body 8, before the fluid flows away from the body in the direction of the outlet 4 (schematically indicated by dashed lines with corresponding arrows). In order to permit this substantially full washing over the curved surface 13 of the ellipsoidal body 8, the latter is oriented in such a way that the semimajor axis of the ellipsoid is oriented coaxially with respect to the inlet axis A of the fluid. Inside the ellipsoidal body 8, LEDs 14 are in turn arranged in such a way that they irradiate the fluid washing over the ellipsoidal body 8 with UV-C radiation through the transparent surface 13. In this case, the LEDs 14 are preferably arranged and designed so that a maximally uniform radiation distribution is achieved on the flowing fluid film.

In the exemplary embodiment schematically represented in FIG. 4, the inlet 4 is arranged below the body 8. From there, the fluid flowing in (see the dashed line with an arrow) impinges on the impingement point 9 of the surface 13 of the body 8. From there, the fluid washes around a spherical section 10 of the surface 13 of the body 8. The flowing fluid film is in this case guided by a fluid guide device in the form of a vasiform wall 52, which extends around in a ring at the end 5 of the inlet 4. Preferably, at least the inner side 53 of the wall 52, as shown in FIG. 4, has a curvature similar or approximately identical to the curvature of the body 8. Furthermore, the wall 52 is shaped in such a way that a gap 54 is formed between its inner side 53 and the surface 13 of the spherical section 10. The end of the spherical section 10 is followed by a circular-cylindrical second section 12 so that the fluid flowing onto the junction of the two sections 10, 12 is diverted over the circumferential edge 56 of the vasiform wall 52. The fluid irradiated with UV-C radiation through the transparent surface 13 then flows along the outer side of the vasiform wall 52 downward in the direction of the bottom of the container 2. There, the irradiated fluid flows out of the container 2 via the outlet 6. The UV-C radiation is emitted by LEDs 14 arranged inside the body 8 in the region of the transparent surface 13. Preferably, the inner side 53 of the wall 52 is configured to be reflective for UV radiation.

Figure 5:
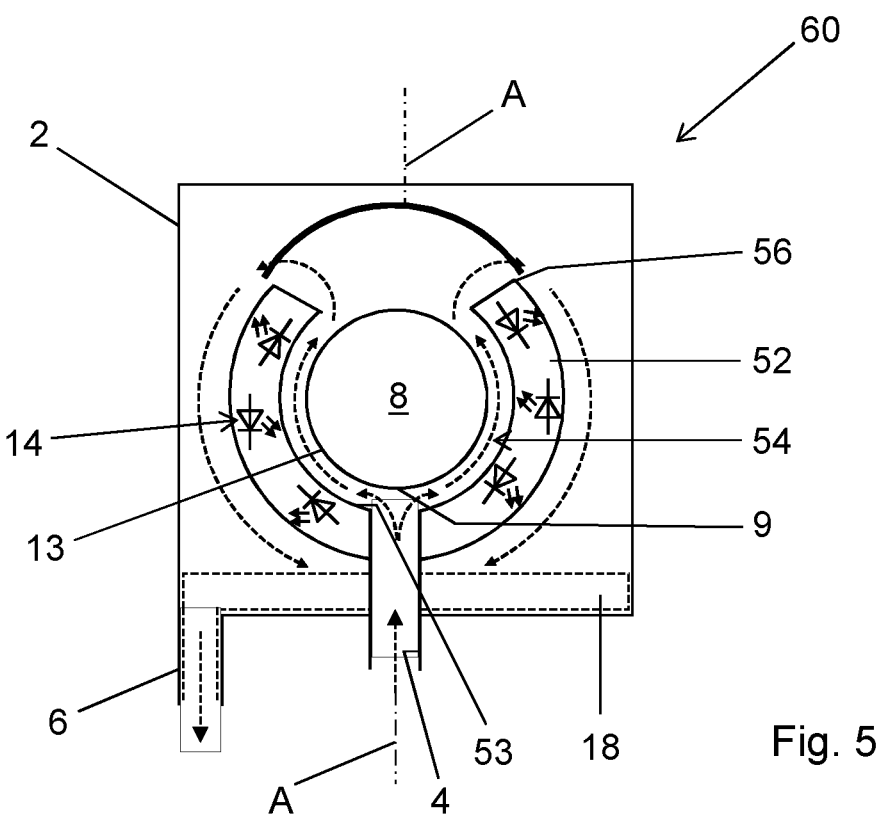
FIG. 5 shows a schematic representation in sectional view of a UV flow reactor having a spherical body according to a fifth exemplary embodiment of the present invention.

FIG. 5 shows a schematic representation in a sectional view of a UV flow reactor having a spherical body 8 according to a fifth exemplary embodiment of the present invention. The concept corresponds substantially to the concept shown above in FIG. 4. Here again, the inward flow takes place from below onto the impingement point 9 of the spherical body 8. From there, the fluid is guided as far as possible uniformly and rotationally symmetrically around the axis A and along the gap 54 between the spherical surface 13 of the body 8 and the inner side 53 of the vasiform wall 52 (fluid guide device) and subsequently flows over the edge 56 of the wall and downward on its outer side. In contrast to the exemplary embodiments presented above in FIG. 1 to 4, however, here the LEDs 14 are arranged not in the interior of the body 8 but in the interior of the vasiform wall 52. Preferably, the LEDs 14 are designed so that they irradiate the fluid with UV-C radiation both along the inner side and along the outer side—i.e. on both sides—of the wall 52. For this purpose, the wall 52 is configured to be transparent for the UV-C radiation on both sides, at least in the region of the LEDs 14. Additionally or as an alternative, LEDs may also be arranged inside the body (this is not shown), in a similar way as described in the previous exemplary embodiment and shown in FIG. 4.

Alternatively, the body may also be configured as a drum (not represented) instead of as a sphere 8. The geometry of the inlet is then adapted accordingly to the drum shape, or a plurality of inlets are arranged along the drum rotation axis.

Figure 6:
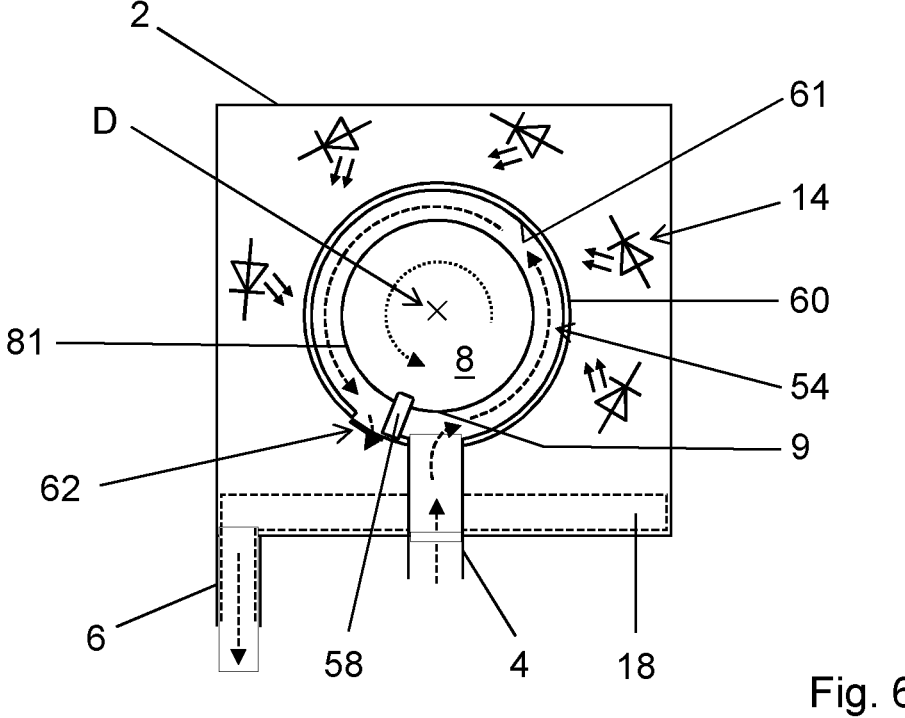
FIG. 6 shows a schematic representation in sectional view of a UV flow reactor having a body designed as a drum according to a sixth exemplary embodiment of the present invention.

FIG. 6 schematically shows an exemplary embodiment having a body 8 configured as a drum (circular cylinder). In the example, the drum 8 rotates counterclockwise about the rotation axis D. For this purpose, the fluid is supplied to the drum 8 via the inlet 4. A fluid guide device in the form of a hollow-cylindrical wall 60 guides the fluid in the sense of rotation through the tubular gap 54 between the lateral face 81 of the drum 8 and the inner side 61 of the hollow-cylindrical wall 60. The lateral face 81 of the drum 8 may have surface structuring, as already mentioned above, for better entrainment of the fluid. In addition, a sealing lip 58 prevents counter-flow of the fluid. Furthermore, the pressing sealing lip 58 assists the self-cleaning of the rotating drum 8. For this purpose, the pressing sealing lip 58 functions in a similar way to a windshield wiper. At the end of the tubular gap 54, directly before the sealing lip 58, a slot-shaped opening 62 is arranged in the hollow-cylindrical wall 60. Through this slot-shaped opening 62, the irradiated fluid flows out of the tubular gap 54 downward in the direction of the bottom of the container 2. There, the irradiated fluid 18 flows out of the container 2 via the outlet 6. The LEDs 14 provided for the irradiation of the fluid are in this exemplary embodiment arranged outside the drum 8 and also outside the hollow-cylindrical wall 60. Instead, the LEDs 14 are arranged between the wall 60, which is transparent for the UV-C radiation of the LEDs 14, and the container 2, preferably as close as possible to the hollow-cylindrical wall 60. The LEDs 14 may alternatively, in a similar way as represented in the exemplary embodiment of FIG. 5, also be arranged inside the wall (this is not shown).

Figure 7:
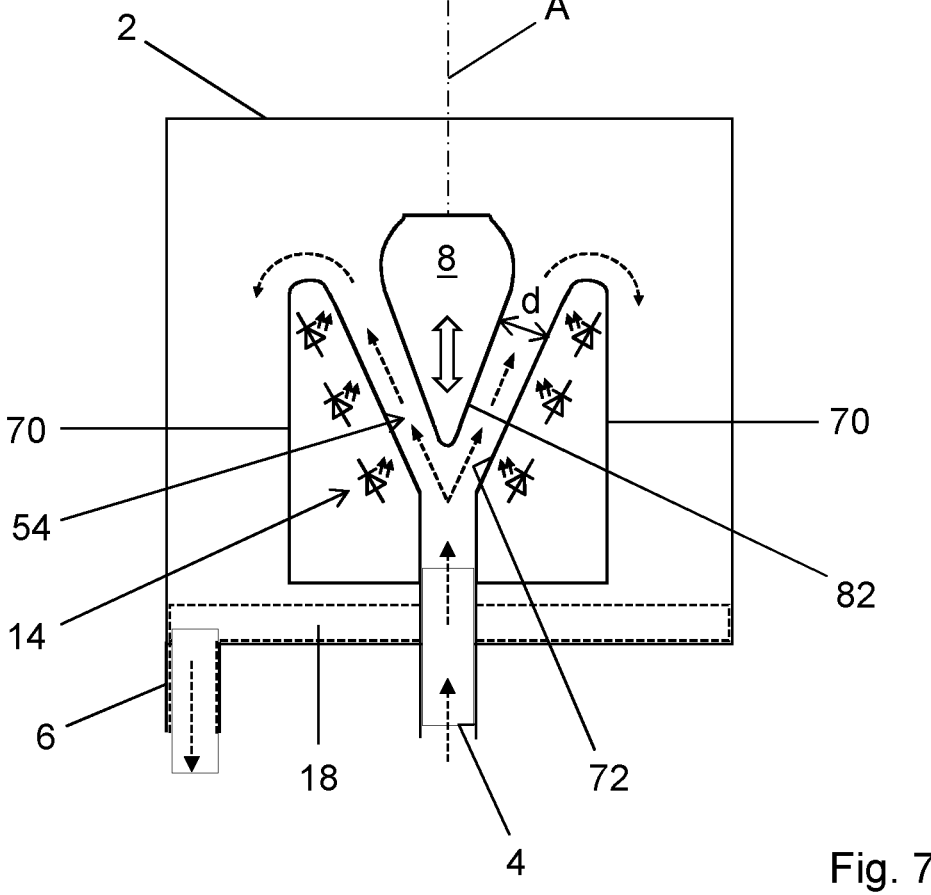
FIG. 7 shows a schematic representation in sectional view of a UV flow reactor having a conical body according to a seventh exemplary embodiment of the present invention.

FIG. 7 shows a schematic representation in sectional view of a UV flow reactor having a conical body 8 (that is to say a body having a conical section) according to a seventh exemplary embodiment of the present invention. The fluid flows via a tubular inlet 4 into a fluid guide device having a vasiform wall 70, the vasiform wall 70 having a cylindrical outer side. The tubular inlet 4 debouches into a funnel-shaped inner side 72 of the fluid guide device 70. The conical body 8 is arranged inside the funnel-shaped inner side 72. The funnel shape of the inner side 72 and the conical shape of the body 8 are in this case matched to one another so that a circumferential gap 54 between the funnel-shaped inner side 72 of the fluid guide device 70 and the conical surface 82 of the body 8 can be adjusted with different gap dimensions d by axial displacement of the conical body 8 along a longitudinal axis A (symbolized by the thick double arrow). With the aid of the gap dimension d that can be adjusted in this way, the layer thickness of the fluid to be irradiated flowing through the gap 54 (again symbolized by corresponding arrows with dashed lines) may be adapted directly to possibly changing conditions, for example turbidity of the fluid. It is therefore substantially possible, under different conditions, to adjust an optimal gap dimension with a view to the highest possible throughput (larger gap dimension) and adequate efficiency of the sterilization, that is to say penetration depth of the radiation into the fluid (smaller gap dimension). In one development which is not represented, sensors that record such changes of the fluid and forward them to a controller for adjustment of the suitable gap dimension d may be provided. Corresponding gap dimensions for different fluid properties may be stored in the controller. A multiplicity of LEDs 14 (again indicated only schematically by symbols) are arranged uniformly distributed along the funnel-shaped inner side 72 inside the vasiform wall of the fluid guide device 70. The LEDs 14 are designed for irradiation of the fluid flowing through the gap 54 with UV-C radiation. The fluid guide device 70 is designed to be transmissive for UV radiation at least in sections.

The shapes of the containers 2 as shown in FIGS. 1 to 7 are to be understood purely by way of example. Depending on the application case or specific configuration, other shapes may also be expedient. For example, in the embodiments with an opposite inflow and outflow (see also FIGS. 1 and 3), the bottom of the container that is used for collection and removal of the irradiated fluid may be funnel-shaped. Preferably, the wall of the containers 2 consists of a material or have a coating that prevents transmission of UV radiation into the outside space and reflects a large part of the radiation back, for example diffusely, into the interior.

In the exemplary embodiments according to FIGS. 1 to 7, disinfecting gases may optionally also be provided inside the container 2, for example $O_3$, $Cl_2$, $ClO_2$, $H_2O_2$.

A device for sterilizing a fluid flowing through comprises a container having an inlet for receiving the fluid and having an outlet for discharging the fluid from the container, and a body having an at least partially curved surface, the body being arranged inside the container so that the fluid flowing into the container via the inlet washes over or around the body at least in the region of its curved surface. The device furthermore comprises a multiplicity of LEDs, each of which is configured to emit light having wavelengths in the range of UV radiation, preferably UV-C radiation. The LEDs are designed to irradiate the fluid washing over or around the curved surface of the body with the UV radiation, preferably the UV-C radiation, of the LEDs.

LIST OF REFERENCE SIGNS

1; 30; 40; 50; 60 device
2 container
4 inlet
5 end of the inlet
6 outlet
8 body
9 impingement point
10 first section (spherically curved surface)
12 second section (circular-cylindrical surface)
13 surface of the body
14 LED
16 foot of the body
18 irradiated fluid
52 vasiform wall (fluid guide device)
53 inner side of the wall
54 gap
56 edge of the wall
58 sealing lip
60 hollow-cylindrical wall (fluid guide device)
61 inner side of the wall
62 slot-shaped opening
70 vasiform wall (fluid guide device)
72 funnel-shaped inner side of the wall
81 lateral face (of the drum)
82 conical surface
A axis
D rotation axis

The invention claimed is:

1. A device for sterilizing a fluid flowing through, comprising:
   a container having an inlet for receiving the fluid and having an outlet (6) for discharging the fluid from the container,
   a body having an at least partially curved surface, the body being arranged inside the container so that the fluid flowing into the container via the inlet washes over or around the body at least in a region of the at least partially curved surface, a multiplicity of light emitting diodes (LEDs), each of which is configured to emit light having wavelengths in a range of ultraviolet (UV) radiation, wherein the LEDs are designed to irradiate the fluid washing over or around the at least partially curved surface of the body with the UV radiation of the LEDs; and further comprising a fluid guide device, wherein a gap is formed between at least a part of the at least partially curved surface of the body and at least a part of a surface of the fluid guide device, and wherein the gap is designed for the fluid to flow through;

wherein a gap dimension of the gap is adjustable.

2. The device as claimed in claim 1, wherein the at least partially curved surface of the body is convexly curved at least in the region on which the fluid coming from the inlet flows.

3. The device as claimed in claim 1, wherein the at least partially curved surface of the body has a rotational symmetry at least in sections.

4. The device as claimed in claim 1, wherein the at least partially curved surface of the body has one or more of the following shapes, at least in sections: sphere, ellipsoid, cone, cylinder.

5. The device as claimed in claim 1, wherein at least some of the LEDs are arranged inside the body and in the region of the at least partially curved surface, in such a way that the light emitted by the LEDs shines through the at least partially curved surface.

6. The device as claimed in claim 1, wherein the at least partially curved surface of the body at least partially includes a material that is transparent for the light emitted by the LEDs.

7. The device as claimed in claim 1, wherein the at least partially curved surface of the body has structuring.

8. The device as claimed in claim 1, wherein the body is rotatably mounted.

9. The device as claimed in claim 1, wherein the at least partially curved surface of the body and the surface of the fluid guide device are formed and designed so that the gap dimension of the gap can be varied by a mutual displacement of the body and the fluid guide device.

10. The device as claimed in claim 1, wherein the body has a section with a conical surface, wherein the fluid guide device has a section with a funnel-shaped surface complementary to the conical surface, and wherein the body and the fluid guide device are arranged along a longitudinal axis so that the gap is formed between the conical surface and the funnel-shaped surface.

11. The device as claimed in claim 1, wherein the fluid guide device comprises a wall in which at least some of the LEDs are arranged in such a way that the light emitted by the LEDs shines through an inner side of the wall into the gap.

12. The device as claimed in claim 1, wherein the inlet comprises a nozzle having one or more nozzle openings.

13. A sterilizing method, comprising:

providing a device as claimed in claim 1;

connecting the inlet of the device to a source of the fluid and the multiplicity of LEDs to an electrical energy supply source;

delivering the fluid into the container through the inlet;

washing over or around at least a part of the at least partially curved surface of the body with the fluid;

irradiating the fluid that washes over or around the at least partially curved surface of the body with the UV radiation of the LEDs; and returning the fluid to the source or into another reservoir via the outlet.

14. The method as claimed in claim 13, additionally comprising:

providing a fluid guide device, wherein a gap is formed between at least a part of the at least partially curved surface of the body and at least a part of a surface of the fluid guide device, and wherein the gap is designed for the fluid to flow through; and varying a gap dimension of the gap based on a change of a property of the fluid flowing through the gap.

15. The method as claimed in claim 14, additionally comprising:

delivering at least one disinfecting gas into the container.

16. The device as claimed in claim 1, wherein the UV radiation comprises UV-C radiation.

* * * * *